United States Patent [19]

Onda et al.

[11] 4,081,810
[45] Mar. 28, 1978

[54] OPENING AND CLOSING DEVICE FOR CAMERA SHUTTER

[75] Inventors: Eiichi Onda, Yotsukaido; Masanori Watanabe, Narashino, both of Chiba, Japan

[73] Assignee: Seiko Koki Kabushiki Kaisha, Japan

[21] Appl. No.: 712,400

[22] Filed: Aug. 6, 1976

[30] Foreign Application Priority Data

Aug. 6, 1975 Japan ................................. 50-95519
Aug. 6, 1975 Japan ................................. 50-108681

[51] Int. Cl.² ............................................. G03B 9/40
[52] U.S. Cl. ................................ 354/246; 354/249; 354/266
[58] Field of Search .............. 354/246, 249, 245, 248, 354/250, 261, 266

[56] References Cited

U.S. PATENT DOCUMENTS

| | | | |
|---|---|---|---|
| 3,810,224 | 5/1974 | Kitai et al. | 354/250 |
| 3,829,878 | 8/1974 | Onda et al. | 354/249 X |
| 3,999,196 | 12/1976 | Inoue | 354/249 X |

*Primary Examiner*—John Gonzales

*Attorney, Agent, or Firm*—Robert E. Burns; Emmanuel J. Lobato; Bruce L. Adams

[57] ABSTRACT

In a camera having an aperture and a shutter of the type having opening blades and closing blades operable sequentially to make an exposure, an opening member for actuating the opening blades is releasably coupled to a driving member which is spring biased in a direction to move the opening blades to open position to initiate an exposure. A spring bias is also applied to a closing member for actuating the closing blades in a direction to close the camera aperture and thereby terminate the exposure. As the closing blades approach closed position, the closing member actuates the connecting member so as to release the opening member from the driving member and also engages the opening member so as to move it in a direction to return the opening blades toward set or aperture-closing position. The opening blades are thereby moved at least partially toward closed position as the closing blades complete their closing movement and the transfer of energy from the closing member to the opening member serves to decelerate the closing blades at the end of their movement and thereby reduce impact.

6 Claims, 7 Drawing Figures

OPENING AND CLOSING DEVICE FOR CAMERA SHUTTER

FIELD OF INVENTION

The present invention relates to an opening and closing device for a camera shutter having opening blades and closing blades which are actuated sequentially to make an exposure.

BACKGROUND OF INVENTION

Metal focal plane shutters for cameras of the type in which an exposure is effected by the sequential operation of opening (leading) blades and closing (trailing) blades have been subject to the following faults.

Firstly, it is difficult to apply such shutters to miniature cameras because of the relatively large space required for containing the shutter blade groups. As a method of eliminating this fault, it has been proposed to make the space for containing the shutter blade groups smaller by dividing the shutters into a larger number of blades or by making the shutter blades smaller. However, in case of the former method, it has been found that the light tightness of the shutter deteriorates as the number of blades into which the shutter is divided increases. Also, the accuracy of the exposure and the endurance of the shutter are impaired because of the harmful effect arising from the increase of the inertial mass of the shutter blade groups. In the case of the latter method, the light tightness of the shutter is decreased because of the reduced overlap of the blades when in position to cover the aperture.

Secondly, a powerful driving force is required for actuating the shutter blade groups because of their large inertial mass. This results in a large force being required to set or cock the shutter and because of the forces involved, the durability of the shutter is impaired.

Thirdly, there is the fault of reexposure by reason of the rebound of the closing blades after finishing the exposing action when the blade speed is increased for obtaining a short exposure or for actuating the shutter by shorter speed thereof for flash synchronization.

SUMMARY OF INVENTION

It is an object of the present invention to eliminate or materially reduce the faults of the prior art shutters. In accordance with the invention, an opening member for operating the opening blades of the shutter is releasably coupled by a connecting member to a driving member which is spring biased in a direction to move the opening blades toward open position to initiate an exposure. When the shutter is released to make an exposure, the driving member acting through the connecting member moves the opening blades toward open position. The opening blades are followed in usual manner by the closing blades actuated by a closing member at an interval depending on the desired exposure time. As the closing blades approach closed position, the connecting member is released so that the opening member is uncoupled from the driving member. Moreover, the closing member acts on the opening member to move it in a direction to return the opening blades toward closed position. In this manner the following advantages are attained.

Firstly, after the opening blades have completed their opening movement, it is possible to shift them rapidly toward set or closed position thereby effectively preventing any reexposure in case of rebound of the closing blades.

Secondly, in the terminal region of the closing action, the connection of the opening member and the driving member for the opening blades is released by the closing member and at the same time the work of shifting the opening member toward set position is carried out by the closing member thereby retarding the closing action. This is advantageous for preventing rebound of the closing blades and improving the endurance and blade speed characteristics of the shutter.

Thirdly, when the invention is applied to shutters having brake mechanism for preventing the bounce of the opening blade, for example by friction, the setting or charging of the shutter becomes light and soft since the opening blades has already passed out of the friction region of such brake mechanism.

Moreover, in accordance with the invention it is possible easily to construct cameras and camera shutters having excellent space and constructional characteristics so that the benefit of the invention is extremely large.

BRIEF DESCRIPTION OF DRAWINGS

The nature, objects and advantages of the invention will be more fully understood from the following description of preferred embodiments illustrated by way of example in the accompanying drawings, in which.

DESCRIPTION OF PREFERRED EMBODIMENTS

Figure 1:
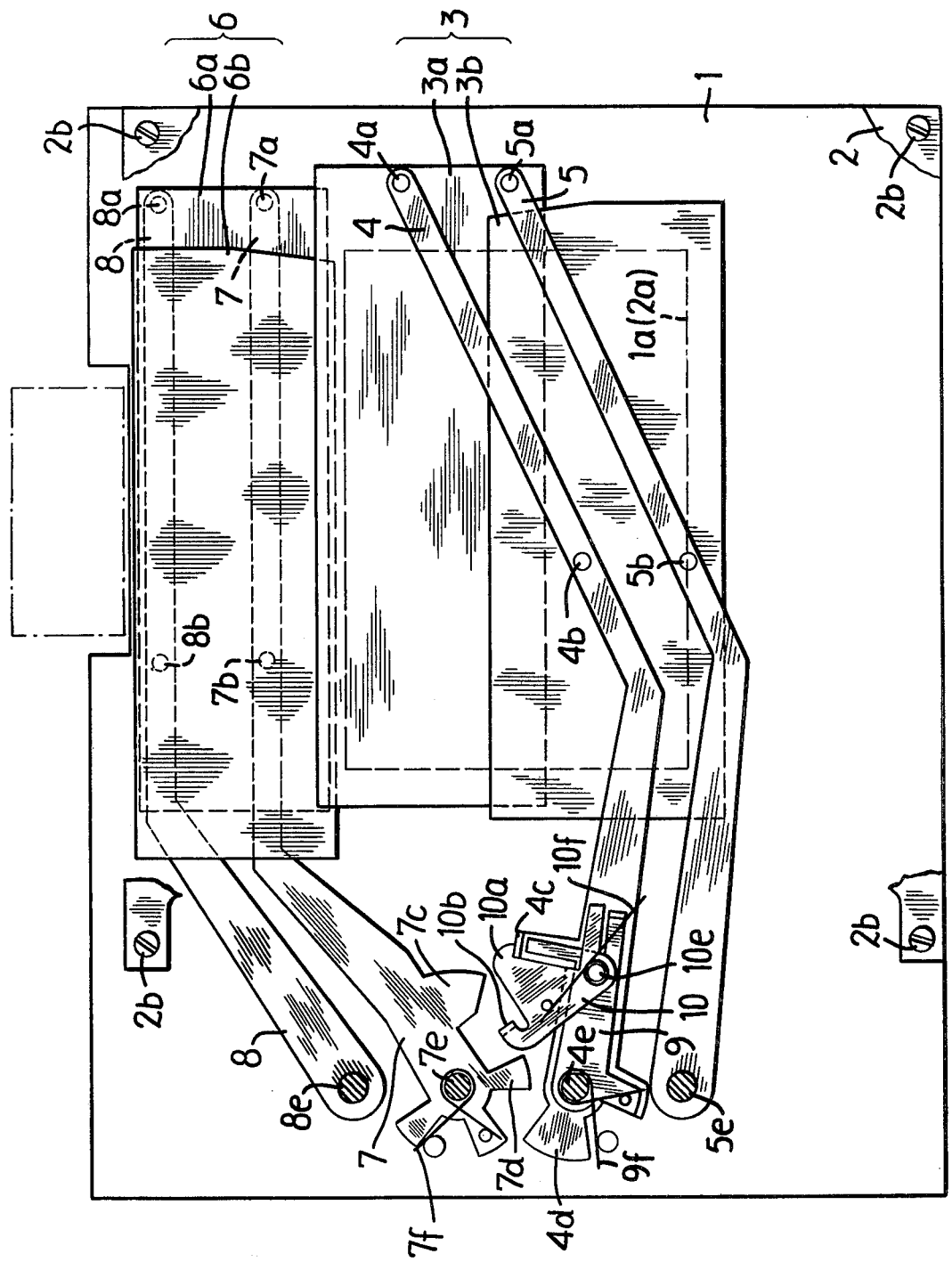
FIG. 1 is a front view of a shutter and shutter operating mechanism in accordance with the present invention showing the shutter in set or charged condition.
Figure 2:
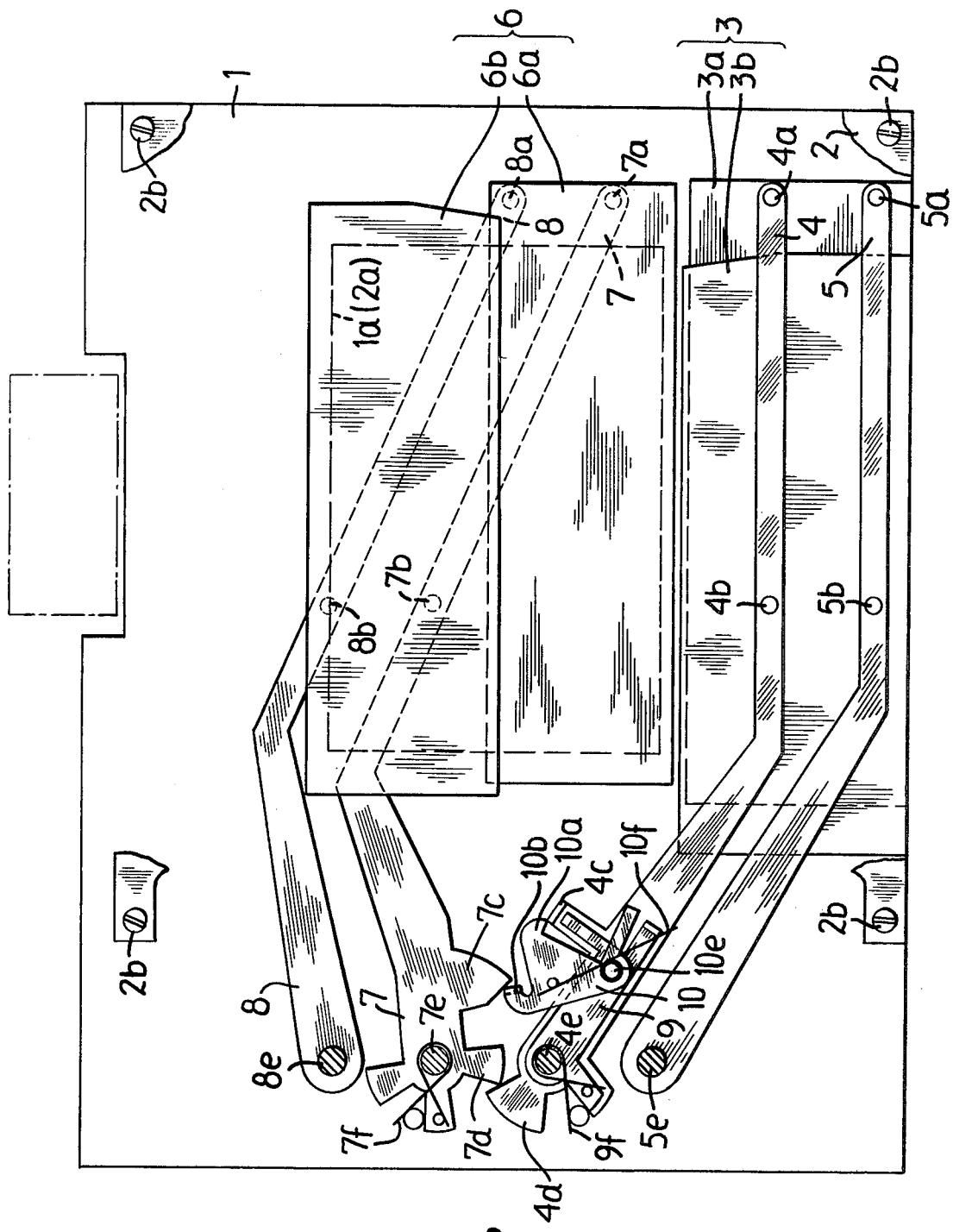
FIG. 2 is a view similar to FIG. 1 but showing the shutter approximately at the completion of an exposure.
Figure 3:
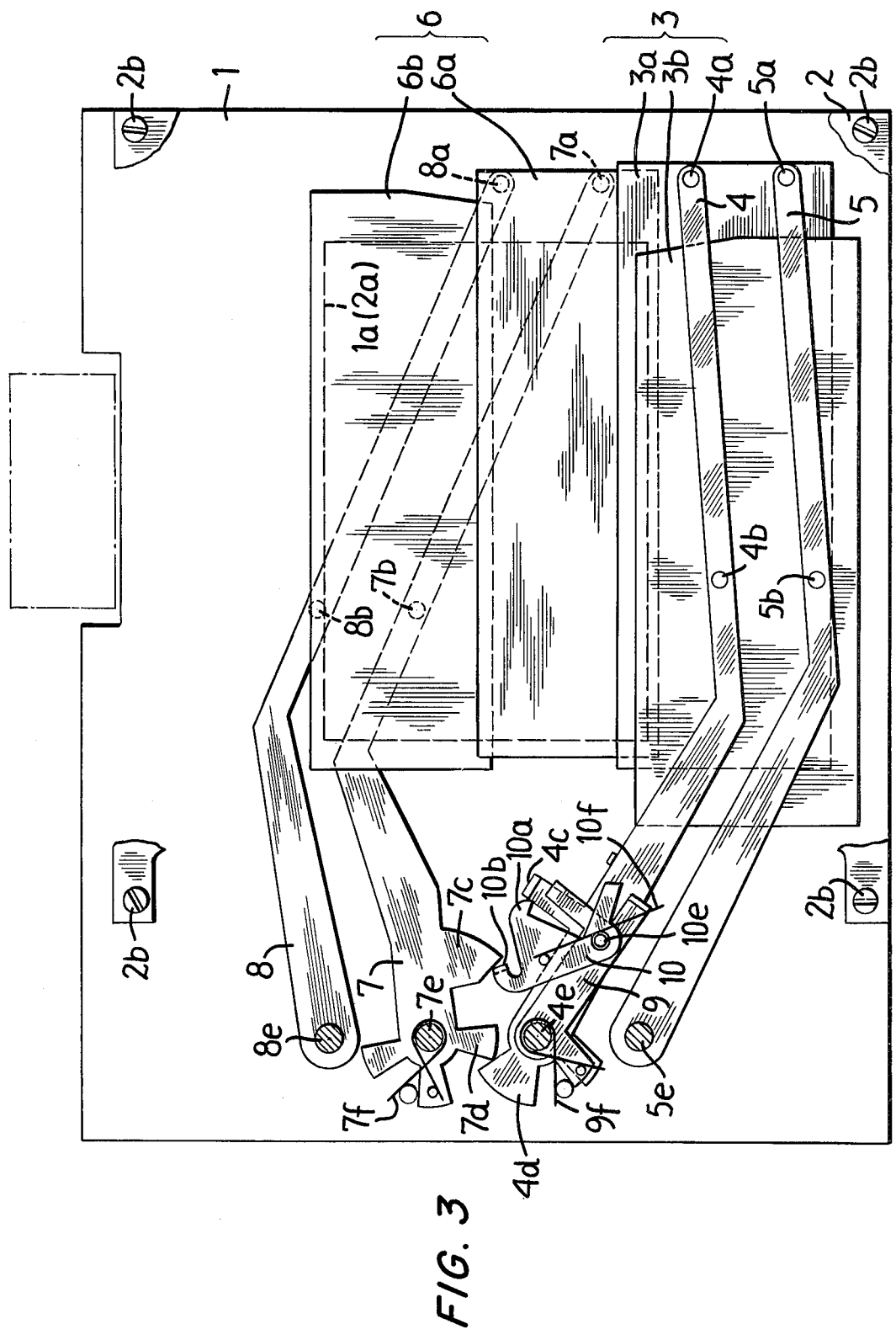
FIG. 3 is a view similar to FIG. 1 but showing the shutter after it has finished a sequence of operations in making an exposure but before it has been reset or charged.

In the embodiment of the invention illustrated in FIGS. 1 to 3, a base plate 1 has an aperture 1a for exposing a film to the light rays. A cover plate 2 has an aperture 2a coincident with the aperture 1a of the base plate and is firmly fixed on the base plate by screws 2b so as to provide an actuating space for the shutter blades between the base plate and cover plate. A group of opening blades 3 for opening the aperture 1a when making an exposure is shown as being composed of two blades, namely an opening blade 3a for forming an opening slit and a shading or shielding blade 3b. The blades are movable by a link mechanism comprising an opening member 4 and an auxiliary opening member 5 which are pivotally mounted on the base plate by pivot pins 4e and 5e respectively. The opening member 4 is pivotally connected with the blades 3a and 3b by pivot pins 4a and 4b respectively while the auxiliary opening member 5 is pivotally connected with the blades 3a and 3b by pivot pins 5a and 5b respectively, thus providing a parallelogram linkage system.

A group of closing blades 6 for closing the aperture 1a to complete an exposure is shown as comprising two blades, namely a slit closing blade 6a and a shading or shielding blade 6b. The closing blades are operable by a link mechanism comprising a closing member 7 and an auxiliary closing member 8 pivotally mounted on the base plate by means of pivot pins 7e and 8e respectively. The closing member 7 and auxiliary closing member 8 are pivotally connected with the closing blades 6a and 6b of pivot pins 7a, 7b, 8a and 8b in a manner similar to the connection of opening members 4 and 5 with the opening shutter blades.

A driving member 9 for the opening blades is pivotally mounted on the base plate 1 with the same axis as the pivot pin 4e of the opening member 4 and is biased in a clockwise direction by a driving spring 9f, i.e. toward a position in which the opening blades open the aperture 1a. A connecting member 10 for connecting the opening member 4 and the driving member 9 of the opening blades is pivotally mounted on the driving member 9 by a pivot pin 10e and is biased in a clockwise direction by a spring 10f. The connecting member 10 is provided with a pawl or hook portion 10a capable of locking and unlocking a bent up tab 4c provided on the opening member 4 so as to connect and disconnect the opening member 4 and driving member 9. The connecting member 10 is also provided with a bent up tab 10b for engagement by the closing member to disengage the pawl 10a from the tab 4c of the opening member 4 and thereby release the opening member 4 from the driving member 9 as will be described below.

The closing member 7 is biased in a clockwise direction by a driving spring 7f, i.e. a direction for moving the closing blades from set position to aperture closing position. The closing member is provided with an arm 7c which projects laterally in position to engage the tab 10b on the connecting member 10 and thereby disengage the pawl 10a from the tab 4c of the opening member 4 when the closing blades approach closed position as illustrated in FIG. 2. The closing member 7 has a second arm 7d in position to engage an arm 4d on the opening member 4 when the parts are in the position shown in FIG. 2.

The operation of the shutter and shutter operating mechanism will now be explained starting with the shutter in set or charged position as illustrated in FIG. 1. When the shutter is released in known manner to make an exposure, the driving member 9 for the opening blades starts to turn in a clockwise direction under the bias of the driving spring 9f. As the opening member 4 is coupled to the driving member by the connecting member 10, it also starts to turn in a clockwise direction thereby moving the opening blades 3 downwardly toward a position to open the aperture 1a and thereby make an exposure of the film. When the required interval for the desired exposure time has elapsed after the opening blades have started the opening movement, the closing member 7 is released by a well-known device (not shown) and the closing member 7 thereupon starts to turn in a clockwise direction under the bias of the driving spring 7f, thus moving the closing blades 6 downwardly toward a position to close the aperture. When the closing blades 6 reach a position slightly before the closing action is finished, the arm 7c of the closing member 7 comes into contact with the bent tab portion 10b of the connecting member 10 and thereby turns the connecting member in a counterclockwise direction. The hook portion 10a of the connecting member 10 is thereby disengaged from the bent tab portion 4c of the opening member 4 and the connection of the opening member 4 and the driving member 9 is released.

Moreover, as the closing member 7 continues its closing movement in a clockwise direction the arm 7d of the closing member comes into contact with the arm 4d of the opening member 4 as illustrated in FIG. 2, thereby turning the opening member 4 in a counterclockwise direction so as to move the opening blades toward set or closed position. The opening member 4 is thus returned toward set or closed position of the opening blades by the driving power of the driving spring 7f for the closing member 7. This has the advantage of decelerating the closing blades in the final portion of their movement, thereby avoiding rebound of the closing blades and reducing the shock incident to stopping the closing blades at the end of their movement. When the closing blades 3 have been shifted to a predetermined position as illustrated in FIG. 3, the sequence of actions initiated by release of the shutter is terminated. When the arm 7d of the closing member 7 comes into contact with the arm 4d of the opening member 4, it is possible to shift the opening blades further upward than the position shown in FIG. 3 by impact force or alternatively it is possible to provide for an elastic or cushioned contact according to the desired characteristics of the shutter action.

When the shutter is to be charged or cocked from the state shown in FIG. 3, the driving member 9 for the opening blades is turned in a counterclockwise direction in well known manner against the bias of the driving spring 9f and at the same time the closing member 7 is turned in a counterclockwise direction against the bias of the driving spring 7f. The opening member 4 and driving member 9 for the opening blades are again connected and the opening member 4 and closing member 7 are engaged by suitable detent means and held in the state shown in FIG. 1 against the bias of the respective springs until the shutter is again released.

Figure 4:
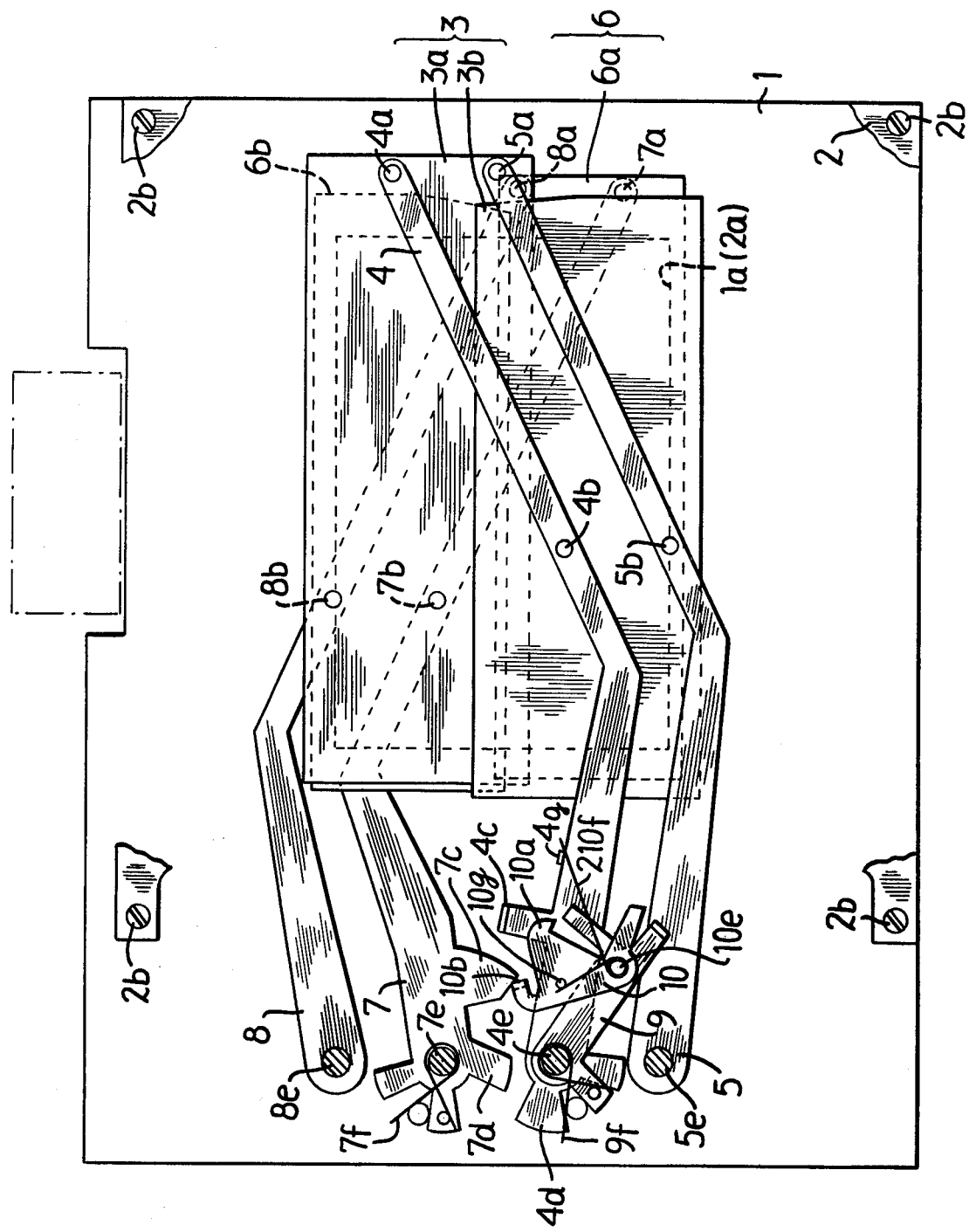
FIG. 4 is a view similar to FIG. 3 but showing a second embodiment of the invention.

A second embodiment of the invention is illustrated in FIG. 4 in which like parts are designated by the same reference numerals as in FIGS. 1 to 3 while corresponding but modified parts are designated by the same reference numerals with the addition of 200. Instead of the spring 10f shown in the first embodiment described above, a spring 210f engages a pin 10g on the connecting member 10 to bias the connecting member in a clockwise direction about its pivot 10e and also engages a bent up tab 10g on the opening member 4 to bias the opening member in a counterclockwise direction, i.e. a direction to move the opening blades toward set or aperture closing position. According to this embodiment after the exposing action has been completed and the opening blades have been moved partially toward closed position by engagement of the arm 7d on the closing member 7 with the arm 4d on the opening member 4, the opening blades 3 are further shifted upwardly by the bias of the spring 210f to the position shown in FIG. 4. It will be seen that the opening blades have been returned almost to the set or charged position. Further, it is possible to hold them securely in the position to which they have been shifted. FIG. 4 shows the parts in the position they assume at the end of the sequence of actions initiated by release of the shutter to make an exposure. They are returned to set or charged condition by moving the driving member 9 and the closing member 7 in a counterclockwise direction against the bias of their respective driving springs as described above. Except as otherwise illustrated and described, the construction and operation of the embodiment of FIG. 4 is the same as that of FIGS. 1 to 3.

Figure 5:
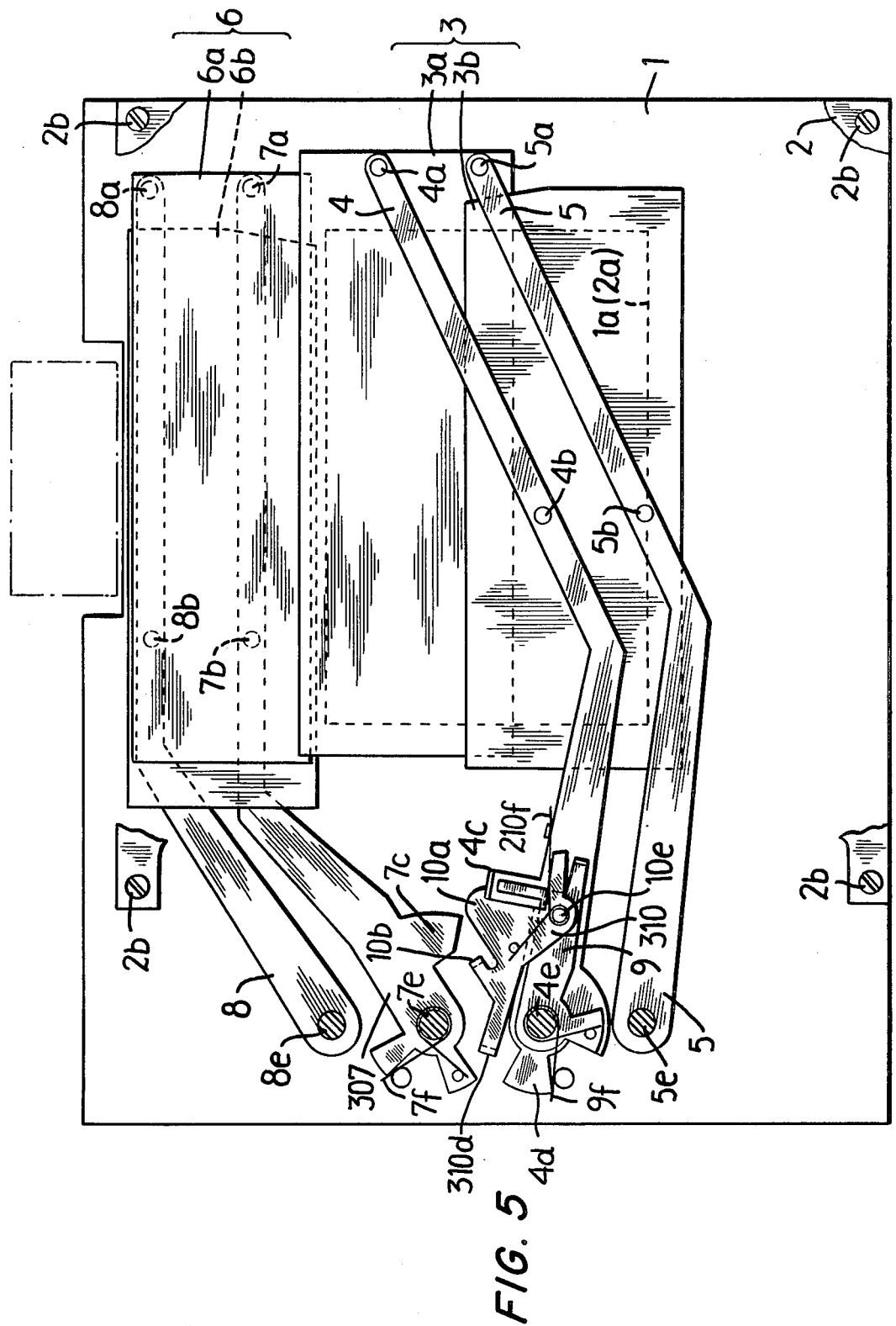
FIGS. 5 to 7 are views corresponding respectively to FIGS. 1 to 3 but illustrating a third embodiment of the invention.
Figure 6:
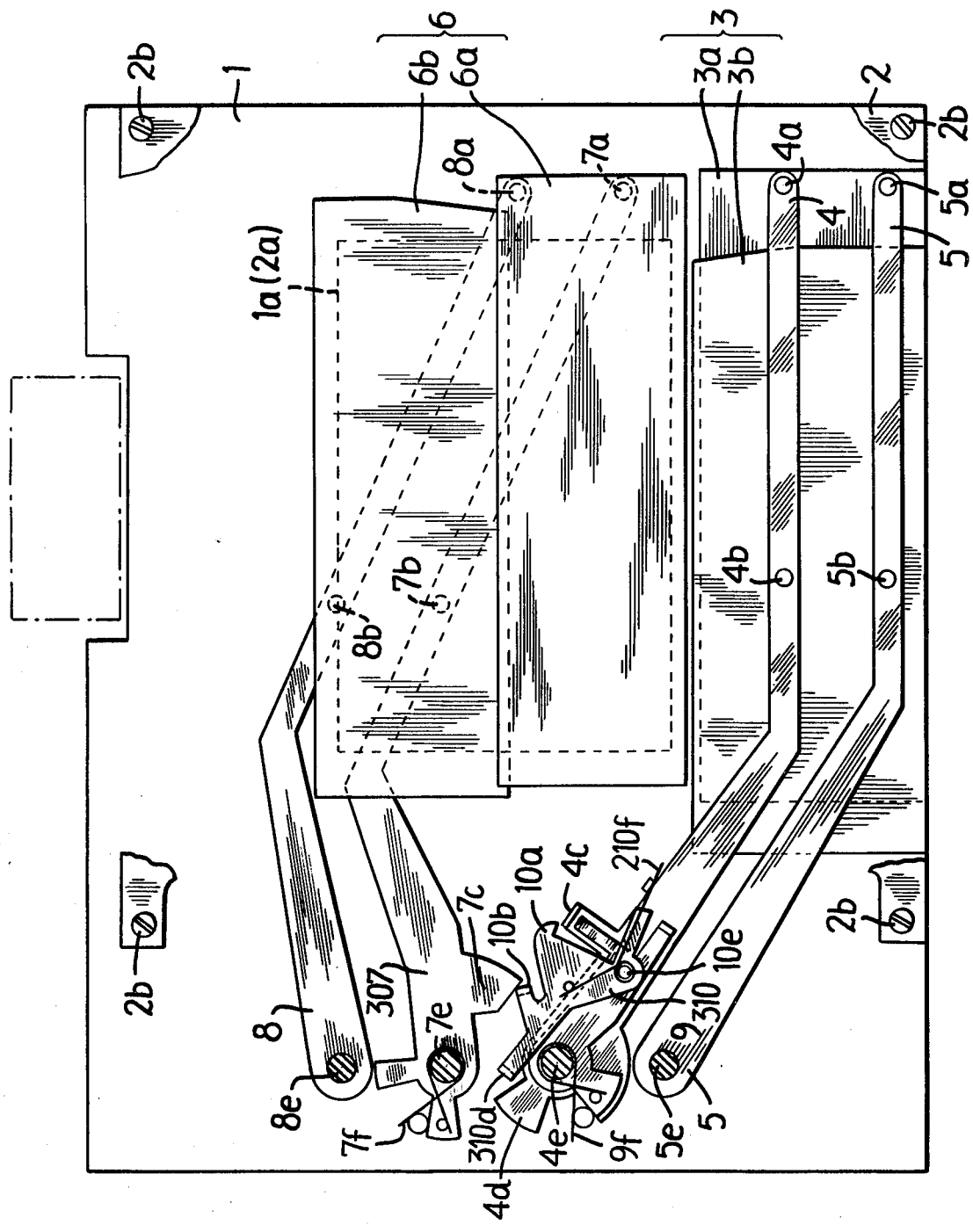
Figure 7:
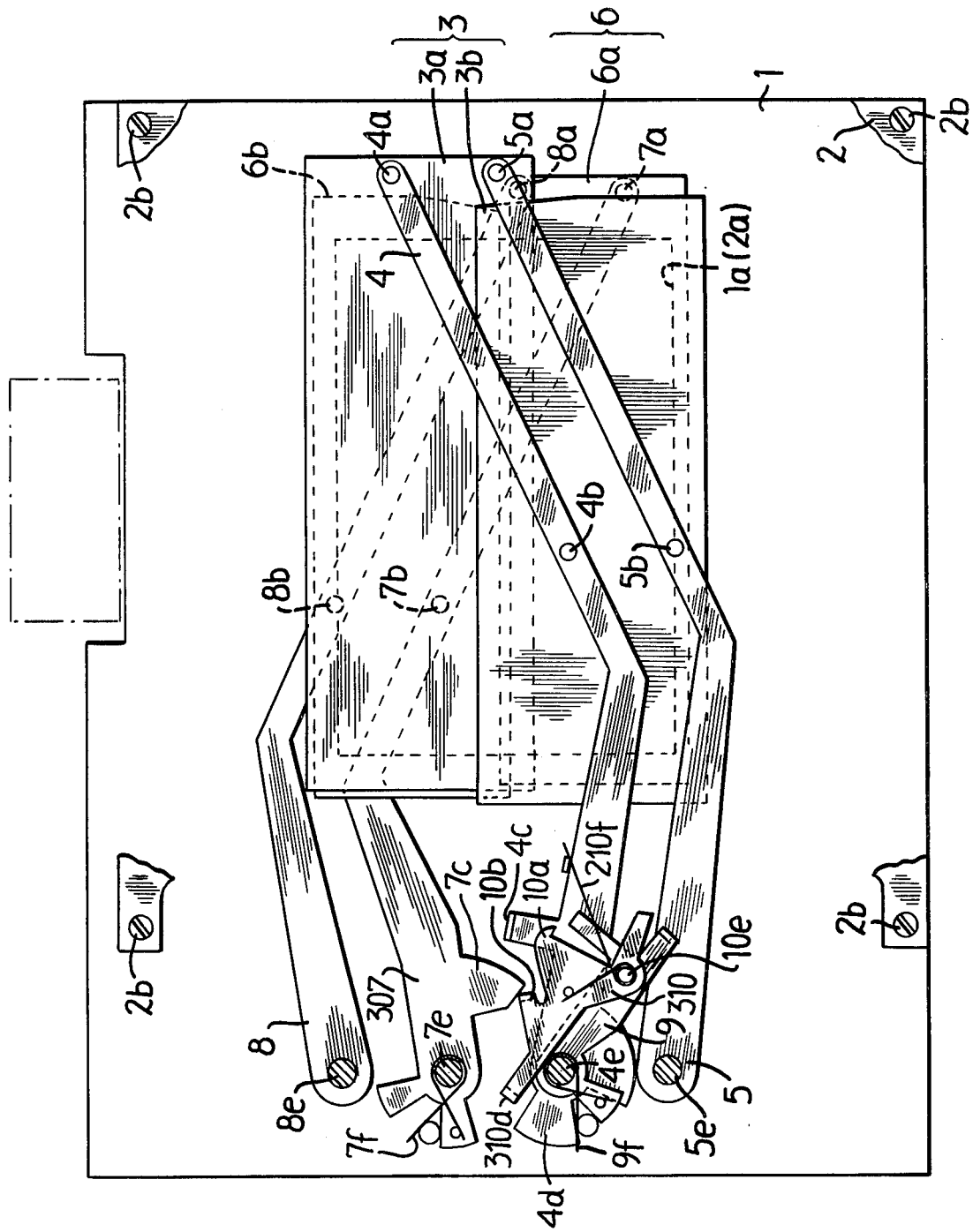

A further embodiment of the invention is illustrated in FIGS. 5 to 7 in which like parts are designated by the same reference numerals as in FIG. 4 while corresponding but modified parts are designated by the same reference numerals with the addition of 300. It will be noted that the closing member 307 does not have an arm corresponding to the arm 7d of the closing member 7 of the previous embodiments. Moreover, the connecting member 310 has an extended arm portion on which there is provided a bent tab 310d.

The operation of the embodiment of FIGS. 5 to 7 will now be explained. Starting with the parts in the position shown in FIG. 5, an exposure is initiated by releasing the opening member 4 by a well known device. The opening member 4 thereby starts to turn in a clockwise direction driven by the driving member 9 which is biased in a clockwise direction by the driving spring 9f and is connected to the opening member 4 by the connecting member 10. The opening blades 3 are thereby moved downwardly so as to open the aperture 1a and make an exposure of the film. When the required interval for the desired exposure time has elapsed after the opening blades start the opening action, the closing member 307 is released by a well known device whereupon the closing member starts to turn in clockwise direction under the bias of the driving spring 7f. The closing blades are thereby moved downwardly in a direction to close the aperture. When the closing blades reach a position slightly before the closing action is finished, the arm 7 of the closing member 307 engages the tab 10b of the connecting member 10 and turns the connecting member 10 in a counterclockwise direction against the bias of the spring 210f. The engagement of the hook portion 10a of the connecting member with the tab 4c of the opening member 4 is released thereby disconnecting the opening member from the driving member 9. Upon further movement of the closing member 307 and the connecting member 310 owing to the spring 7f and inertia forces, the bent tab portion 310d engages and pushes on the arm 4d of the opening member 4, thereby turning the opening member 4 in a counterclockwise direction so as to shift the opening blades 3 upwardly toward set or closed position. As in the embodiment of FIG. 4, the spring 210f is so constructed as to provide a further driving force for shifting the opening blades further upwardly to the position shown in FIG. 7. However, if desired the spring action of the spring 210f may be omitted whereupon at the conclusion of an exposure, the opening blades are moved upwardly only by engagement of the tab 310d on the connecting member 10 with the arm 4d of the opening member 4 as described above. Alternatively, other spring means can be used for assisting in and continuing the upward movement of the opening blades. FIG. 7 shows the parts in the positions they assume at the conclusion of a sequence of actions initiated by release of the shutter to make an exposure.

In order to set or charge the shutter from the state shown in FIG. 7, the driving member 9 for the opening blades is turned in a counterclockwise direction by well known method against the bias of the driving spring 9f and at the same time the closing member 307 is turned in a counterclockwise direction by well known method against the bias of the driving spring 7f. The opening member 4 and driving member 9 are thereupon again connected by the connecting member 10 and the opening member 4 and closing member 307 are engaged and held in set position in known manner until the shutter is again released to make another exposure. The parts are thus restored to the set condition shown in FIG. 5.

It will be understood that the invention is not restricted to the embodiments described above. For example, the period of releasing the connection between the opening member 4 and the driving member 9 for the opening blades may be either just before or just after the finish of the exposing action. Also, the period at which the closing member starts to push the opening member to shift the opening blades in a direction toward set position after having finished the exposing action can be just before or after the release of the connection of the opening member and the driving member for the opening blades. Moreover, the invention is applicable to shutters having groups of opening and closing blades or single opening and closing blades or having rotary blades instead of translatory blades. Likewise, the invention is applicable to cameras with focal plane shutters or with lens shutters of the type having opening and closing blades.

What we claim is:

1. An opening and closing mechanism for the shutter blades of a camera having an aperture, at least one opening blade to initiate an exposure and at least one closing blade to terminate the exposure, comprising an opening member for operating the opening blade, a closing member for operating the closing blade, a driving member associated with the opening member, means for releasably connecting the driving member with the opening member, means for biasing the driving means in a direction to move said opening member connected thereto in a direction to move said opening blade from set position toward open position, means for biasing said closing member in a direction to move said closing blade from set position toward closed position, and means transmitting closing movement of said closing member said opening member to move said opening member in a direction to return said opening blades toward set position.

2. An opening and closing mechanism according to claim 1, wherein said opening member and said driving member are pivotally supported coaxially with one another and in which said connecting means maintains said connection during exposure actuation of said opening blade.

3. An opening and closing mechanism according to claim 2, wherein said connecting means comprises a connecting member pivotally mounted on said driving member and having a pawl portion releasably engageable with a portion of said opening member.

4. An opening and closing mechanism according to claim 3, wherein said connecting member has a portion engageable by said closing member as said closing member approaches the end of its closing movement to disengage said pawl portion from said opening member.

5. An opening and closing mechanism according to claim 4, wherein said connecting member has a second portion engageable with said opening member to transmit closing movement of said closing member to said opening member to move said opening member toward set position.

6. An opening and closing mechanism according to claim 1, wherein said transmitting means comprises inertia means acting on said opening member to supplement and continue movement of said opening member toward set position by said closing member.

* * * * *